A.H. Emery's Imp'd Weighing Machine.
4 Sheets--Sheet 2.
No. 123,253. Fig. 7. Patented Jan. 30, 1872.
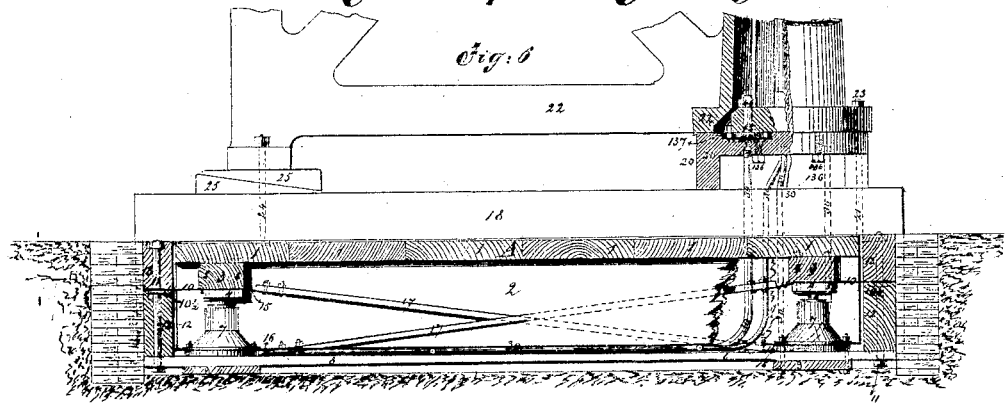
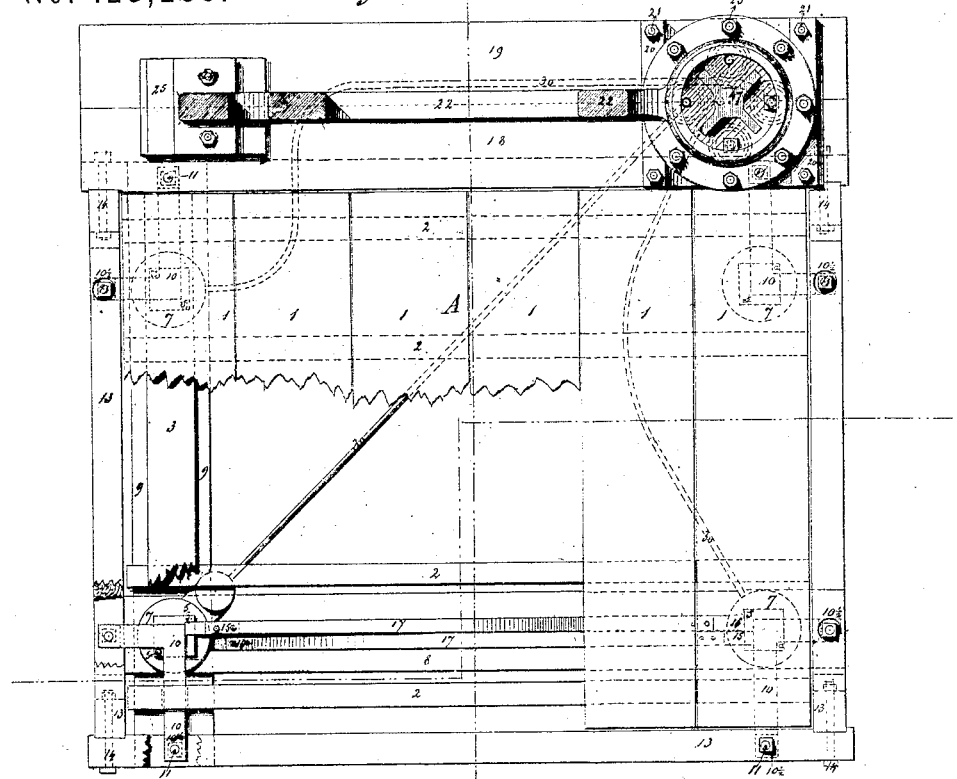
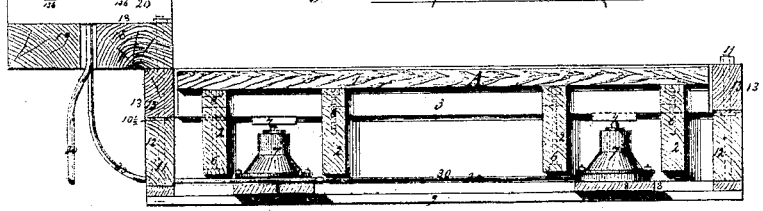
Witnesses: Malcolm Seaton, A. Moore
Inventor: Albert H. Emery

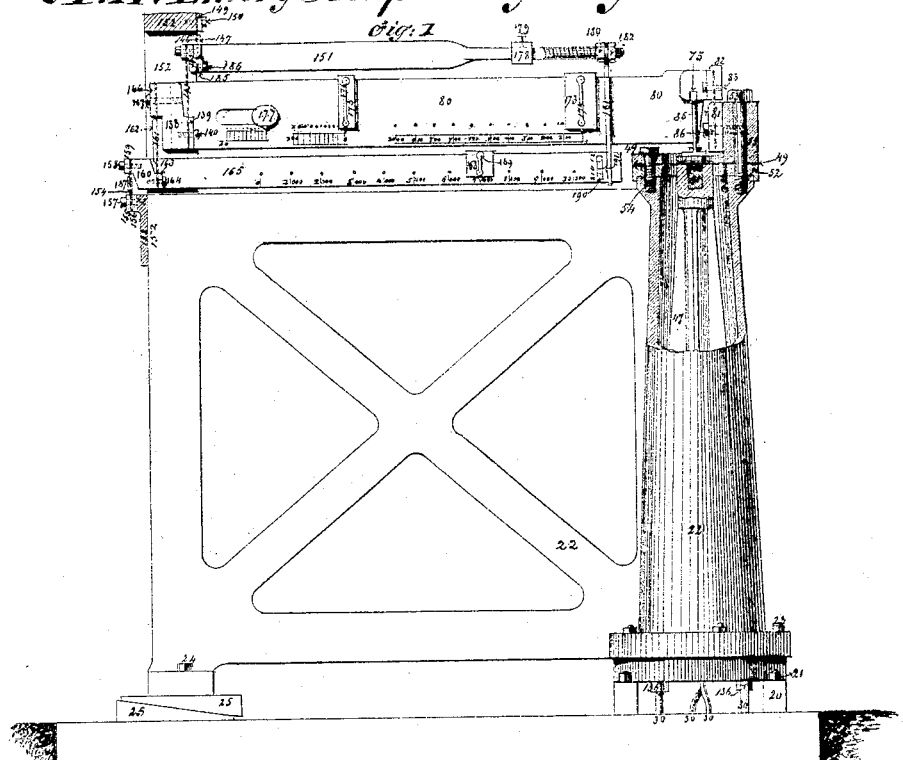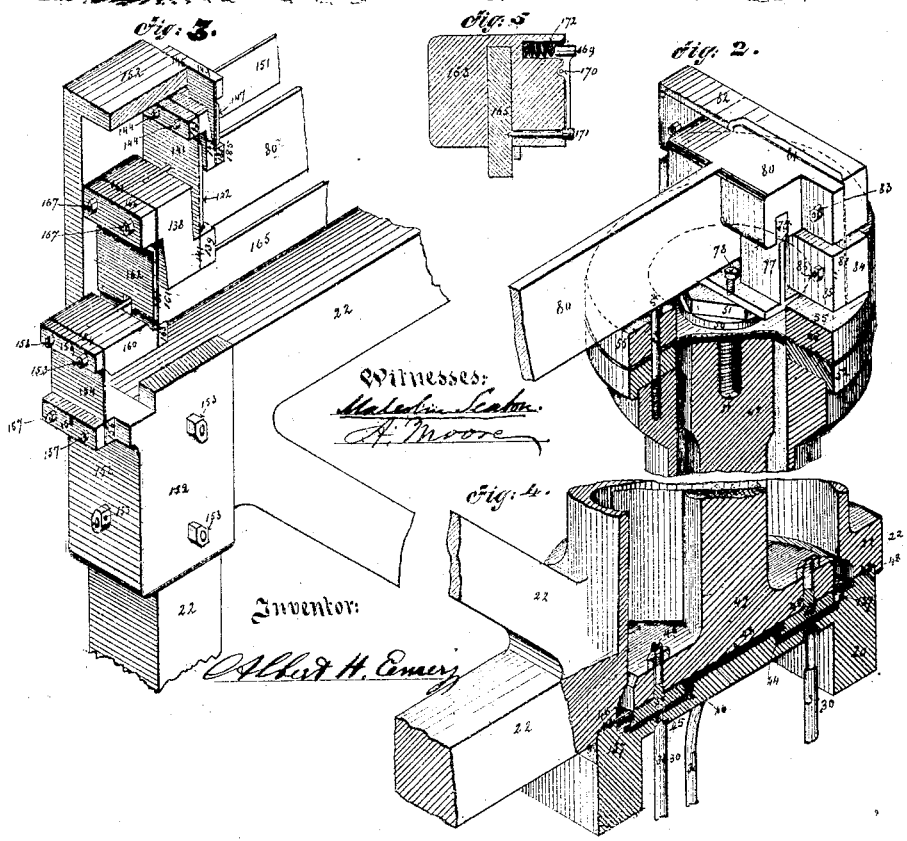

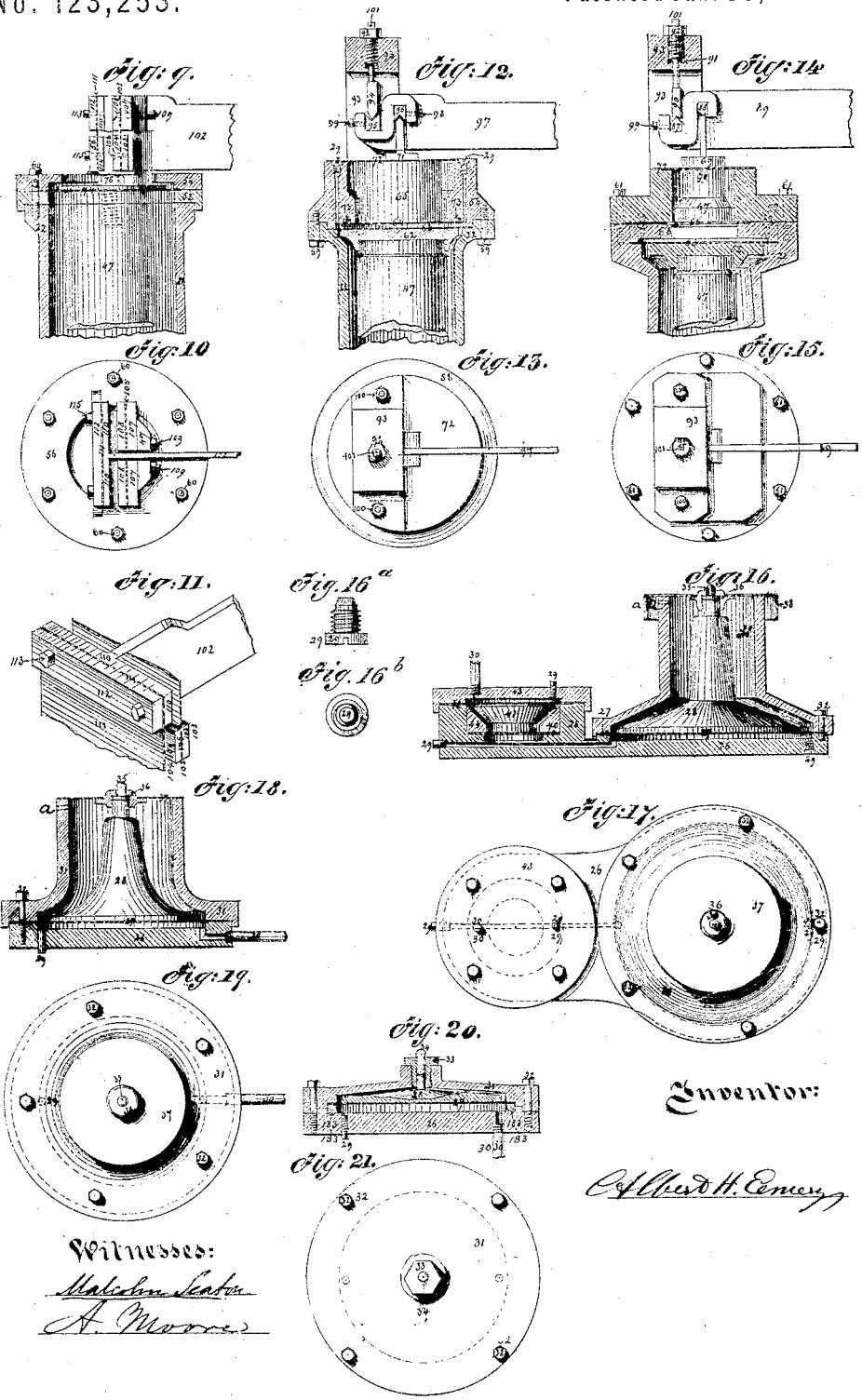

A. H. Emery's Imp'd Weighing-Machine.
No. 123,253.
Patented Jan. 30, 1872.
4 Sheets—Sheet 4.
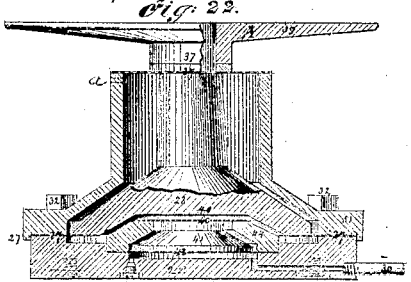
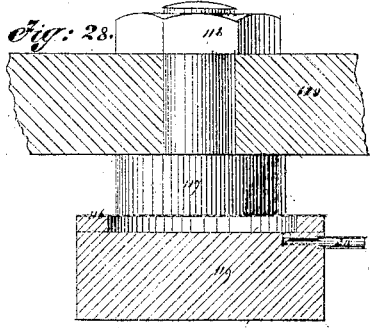
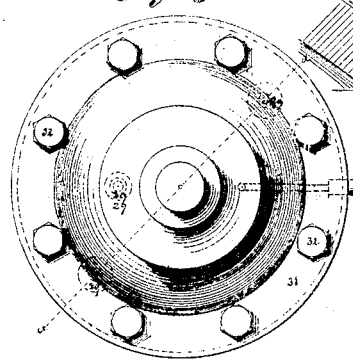
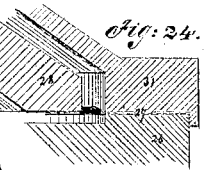
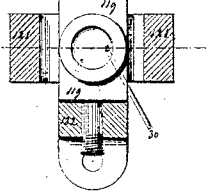
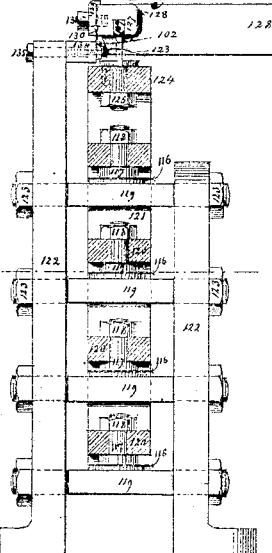
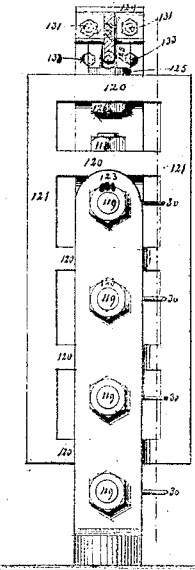
Witnesses:
Malcolm Seaton
A. Moore
Inventor:
Albert H. Emery 123,253

UNITED STATES PATENT OFFICE.

ALBERT H. EMERY, OF NEW YORK, N. Y.

IMPROVEMENT IN WEIGHING-MACHINES.

Specification forming part of Letters Patent No. 123,253, dated January 30, 1872.

SPECIFICATION.

I, ALBERT H. EMERY, of the city, county, and State of New York, have invented a new and Improved Weighing-Machine, of which the following is a full and exact specification:

The nature of my invention consists in providing weighing-machines with three classes of improvements.

The first relates to the method of preventing horizontal movement of the platforms of weighing-machines.

The second relates to the method of receiving the load or the pressure from the load to be weighed upon hydraulic supports and transmitting a fractional portion thereof to the scale-beam when it is to be weighed, together with improvement in all the parts relating thereto.

The third relates to the arrangement of the levers used for the scale-beams, the arrangement, construction, and use of the weights for the scale-beams, and the method of fixing and connecting the scale-beams.

To enable others skilled in the art to make and use my invention, I will proceed to describe the precise construction and operation thereof.

There are four sheets of the drawing making part of these specifications, in all of which like figures represent like parts.

Sheet 1 shows a side elevation of the scale or weighing beams with their weights and connection complete; also, some of the details of the weights and connections of the weighing-beams and pressure-column which transmits the pressure from the receiving pressure-supports to the weighing-beams. Sheet 2 shows the plan, Fig. 7, and two elevations, Figs. 8 and 6, of the platform and hydraulic supports, together with the pieces fixing the platform in a way to prevent horizontal movement of the same. Sheets 3 and 4 show details of various parts of the machines.

On Sheet 2, Figs. 6, 7, and 8, pieces No. 1 are the planks forming the platform, and on which the load is to be weighed. These planks No. 1 rest upon joists No. 2, shown in the same figures. These joists No. 2 are supported by being bolted or screwed to pieces No. 3 by bolts or screws No. 6, whence pieces Nos. 1, 2, 3, &c., make up the platform A, which in small machines may be made of a single piece of cast-iron. This platform rests upon pieces No. 4, which are made of cast-steel or chilled iron, and are bolted to pieces No. 3 by bolts No. 5. In small scales, where the platform is made of cast-iron, these pieces may be simply legs cast on the platform. Pieces No. 4 rest upon the hydraulic-pressure supports No. 7, of which there may be any number, as required, from one upward. In a very small scale for weighing there need not be but a single one of these hydraulic-pressure supports No. 7, in which case the platform is fastened firmly to it, as shown in Fig. 22, Sheet 4, where 39 is the platform; but in all cases of large scales I make use of not less than three supports, usually 4; and for very large scales, or those having long platforms, like those for weighing locomotives and tenders, or whole trains, I make use of several pairs of these supports, placed under the platform at suitable distances from each other. These pressure-supports No. 7 rest upon and are bolted to planks or casting-pieces 8 and 9. Around the platform A is built a frame of pieces, 12 and 13, bolted together by bolts Nos. 11 and 14. Soldered to pieces No. 4 are thin plates of sheet metal, pieces No. 10, usually of brass or copper. These plates have soldered to their outer ends a thick plate or washer, No. 10½, which passes around bolts No. 11, which secures pieces No. 10, and thus No. 4, firmly to the frame surrounding the platform. These pieces No. 10 may be fastened to No. 13 by screws or any other convenient way, and when secured they hold or fix the platform A securely against any horizontal movement, while they offer little or no resistance to the small vertical movement required in weighing. Another similar method of securing the platform against horizontal movement is to solder or fasten pieces of sheet metal Nos. 15 and 16, respectively, to the top of No. 4 and bottom of No. 7, as shown in the drawing in Figs. 6 and 7, and then connect these pieces Nos. 15 and 16 by strips of wood Nos. 17 17. If pieces Nos. 8 and 9 are made of iron, then pieces No. 17 should be also; but should pieces Nos. 8 and 9 be of wood, then 17 must also be of wood, on account of securing equal expansion. The plates Nos. 15 and 16 are made thick at the end when they are bolted or riveted to No. 17; but should 17 be of iron, they may be soldered thereto without additional thickness. When the platform is secured from horizontal movement by the use of pieces Nos. 15, 16, and 17, then all of pieces Nos. 4 and 7 are connected in the same way as the two shown in the drawing, so as to prevent movement in any horizontal direction; and when the platform is so secured, we may, if we desire, dispense with the under part of the frame surrounding it— that is, leave out pieces 12 and put a light wall of stone or brick instead, to support pieces 13 and keep the dirt from falling in the pit. By supporting the platform on pieces Nos. 3 and 4 and placing the hydraulic-pressure supports No. 7 between the joists 2 2 instead of below them, we avoid making a deep pit in which to put the scales. These hydraulic-pressure supports No. 7, Figs. 6, 7, and 8, Sheet 2, are made in various ways, as shown in Figs. 16 and 17, 18 and 19, 20 and 21, Sheet 3, and Figs. 22 and 23, Sheet 4. They all have a bottom plate, piece 26, in the top of which is turned a shallow circular chamber, covered with a diaphragm of thin sheet metal, usually brass or copper, pieces No. 27. In Figs. 16, 18, and 22 this thin diaphragm is soldered directly to the top of pieces No. 26; but in Fig. 20 it is soldered to a ring, piece No. 183, usually made of brass, and this ring is then placed in the chamber turned in piece 26 and soldered therein. The reason why I make use of this ring No. 183 is, that in soldering the diaphragm No. 27 to piece No. 26 there is danger that capillary attraction will cause the solder to fill up the sharp corner of the chamber between the diaphragm 27 and casting 26. Piece 26 is usually made of cast-iron. On top of the diaphragm 27 is soldered piece No. 28. The pieces 27 and 28 (and 183, if used) should be first soldered together, and then piece 27 or 183 is soldered to piece No. 26, using a solder that melts at a lower temperature than that used to solder 27, 28, and 183 together, so that we need not unsolder in one place when we solder in the other. In soldering 27 to 26 a templet should be used to hold 28 concentric with the chamber in 26. Piece 31 is a cap, usually of cast-iron, faced in a lathe on the side to be used next to 26. It is cast hollow, forming a chamber considerably larger than 28, which it is to cover. The interior cylindrical portion of this chamber must be dressed very accurately to a particular diameter and then placed over piece 28 exactly concentric therewith. To secure this accuracy of position I usually leave a flange on piece 31 which will just fit over the top of piece 26, and this part of 26 should always be dressed concentric with the chamber therein. Piece 31 is secured to 26 by bolts 32. The chamber in 26 under the diaphragm 27 is to be filled with oil or glycerine, or any non-compressible liquid which will not freeze or corrode the diaphragm 27. In filling these chambers two openings are always provided, one on each side, close to the side. When filling, the piece is turned so as to bring the diaphragm vertical; then the liquid to be used is forced into the chamber at the lower opening until it comes out at the other entirely free from air. An air-pump may also be used to exhaust the chamber of all air, should it be necessary. Having filled the chamber with the proper liquid to remain there and removed all the air, the chamber is then sealed by the sealing-screws 29 and pipe 30, as in Figs. 18 and 19, 20 and 21, or by two sealing-screws, 29, as shown in Figs. 16 and 17, or 22 and 23, where, in Fig. 23, the two sealing-screws, as shown in plan on line $a\ a$, and are revolved out of their true position to show them in elevation in Fig. 22. One of these sealing-screws 29 is shown in plan and elevation, full size, in Figs. 16$^b$ and 16$^a$, Sheet 3. After the whole instrument has been adjusted these screws 29 are soldered in to prevent any possible leak by them, soldering around their heads.

Piece 33, shown in Figs. 20 and 21, is a metallic screw, usually of brass, passing loosely through which, and resting on the top of 28, is the piece 34, of cast-steel, hardened. This piece 34 has both ends rounded, so that when the pressure comes on it from the load on the platform it will rest wholly on the center of piece 28, and not tend to tip it either way. Piece 35, in Figs. 18 and 19, and 16 and 17, is made of steel, tempered, and rounded on the top. It receives all the load from piece 4, which comes on the platform over it, and transmits the same to piece 28. It is rounded on the top, for the purpose of reducing the tendency to rotate when the load from 4 does not come in the line of its axis. Piece 36 is a ring, of brass or other suitable material, which slips over pieces 35 and 28, securing 35 in its place, and keeping 28 from rotating under the action of the load on it, transmitted through piece 35 from piece 4. This piece 36 is kept from horizontal movement by means of a thin diaphragm-piece, No. 37, in Figs. 18 and 19, and 22 23, which is soldered to piece 36, and soldered or bolted to piece 31, usually being soldered. Piece 28, being kept from rotation by the two diaphragms 27 and 37, as described, cannot rotate on top, but may be moved up and down by springing these diaphragms, which are made very thin, so as to move very short distances very easily. There is an annular space left between pieces 28 and 31, and the wider this space or the part next the diaphragm, the more free will be the vertical movement of these diaphragms; but this space must not be so much that the diaphragm cannot stand the pressure of the liquid under it in the chamber, which pressure will be determined by the size of diaphragm exposed to the liquid, and by the pressure on the liquid from the load transmitted from the platform through pieces 4, 35, 28, and 27.

In Figs. 16 17, Sheet 3, the diaphragm 38 forms a cup over the case 31, to prevent the water from running into the hole $a$, made in the top of piece 31. This cup form of 38 is only necessary when the machine is set where water is liable to come around and over the piece 31. This hole $a$ in piece 31 is made to equalize the pressure of the air on both inside and outside of 31. The diaphragm 38 answers all the purposes of 37, and the additional are here mentioned.

Piece 20, shown in Fig. 4, Sheet 1, is usually made of cast-iron. It is dressed in a lathe on the top and on the sides near the top, and then has a large chamber turned in the top. In the bottom of this chamber are turned out as many small chambers as there are hydraulic-pressure supports under the platform of the weighing-machine. The lower part of these small chambers is made smaller than the upper part. A very thin diaphragm, 44, of sheet metal, is soldered to the end of the cylindrical piece 45, and also soldered to the brass ring 137, after which this ring is soldered to piece 20 by a solder which melts at a lower temperature, thus making as many circular chambers between these thin diaphragms No. 44 and the casting 20 as there are pressure-supports. The pipes No. 30 connect each one of these small chambers with each of the chambers in the pressure-supports, one pressure-support being connected with but one of these chambers.

The pressure in the chambers in the pressure-supports will then be exactly equal to the pressure in the small chambers in No. 20, and any weights placed on the platform A will give pressure in the pressure-supports under it, and these will, through the pipes 30, communicate an equal pressure to the liquid in the chambers in piece 20, when the diaphragms covering these will be pressed against pieces 45, and they will communicate this pressure to piece 47, to which pieces 45 are securely fastened by the nuts No. 46. Diaphragms No. 44 keep piece No. 47 from moving horizontally at the bottom; but they are very thin, and for this reason, to prevent undue strain upon them, I make use of the thin diaphragm 48, which is held to 47 by the pressure between 45 and 47, and held to 20 by the pressure between it and 22, produced by the bolts 23, which also secure 20 and 22 together. Bolts 24 and 21 secure 22 and 20 to the frame on which they sit, and the wedges 25 serve to level the works properly.

Should but one pressure-support be used, as in Fig. 22, to support the platform A, there will be but one chamber in No. 20, and the diaphragm to that may be soldered directly to 47, being placed concentric with it and its chamber. On the upper end of the column 47 is placed the thin diaphragm of metal piece 49, Fig. 2, or 74, Fig. 9, soldered to the cast-iron ring 52 and washer 50, in Fig. 2, or 75, in Fig. 9, piece 52 being held in its place by the flange on its bottom, and by the screws 53 and 54, in Figs. 1 and 2, and 60, in Fig. 9, which also hold the cast-iron pieces 55, in Fig. 2, or 56, in Fig. 9, to their places. Piece 22 is of cast-iron. It surrounds the column of 47, and also supports the outer end of the weighing-beams, the inner end being fixed to piece 55. The washer 50 is held from horizontal movement by the diaphragm 49, to which it is soldered. It is also bolted to 47 by the screw 51, and keeps it from moving horizontally at its upper end. The piece 47 is, therefore, kept from horizontal movement at both ends, but is free to move short distances in a vertical direction, except to the extent of the resistance to vertical movements of the diaphragms 44, 48, and 49, which are made very thin that 47 may move in this direction very easily. When, therefore, pressure is put upon the platform A by weight or otherwise, such pressure will give pressure to the liquid in the pressure-supports No. 7, and such pressure will be transmitted through the pipes No. 30 to the liquid in the chambers in piece No. 20, and through the diaphragms of these chambers and pieces 45 to piece 47, and through it to the screw-piece 51, on the head of which stands the steel piece 77, which transmits this pressure directly to the knife-edge No. 75 of the scale-beam No. 80. (See Figs. 6, 7, and 8, Sheet 2, and 1, 2, and 4, Sheet 1.)

Should the platform A be very long the pipes 30, leading from the pressure-supports 7 to the chambers in No. 20, should be so arranged that those leading from supports on opposite sides of the platforms in pairs should connect with chambers opposite to each other under 47, as the pressure of the liquid in these pairs is nearly equal in each, and when equal there is no tendency to rotate 47. In making a set of pressure-supports great care should be taken to make the cylindrical parts of pieces 28 all exactly alike in diameter, and the cylindrical part of the interior of 31 surrounding it all exactly of the same diameter, and at the same time all the chambers in No. 20 must have rings No. 137 of equal interior diameter, and piece No. 45 of equal diameters. When this is the case, and at the same time the diaphragms No. 27 are all alike, and those No. 44 are all alike, it will make no difference in weighing whether the weight is evenly or unevenly distributed over the platform A. Should the pressure-supports not be alike, so as to give equal pressure to the liquid in each, when equal loads are placed over each on the platform, we may correct the machine for such errors by adjusting the size of the diameters of pieces 45 until the same load added on the platform over each of the pressure-supports will give the same upward pressure on each of the pieces 45, so that it will not matter on what part of the platform A the load is placed. It is not desirable to bring a very heavy pressure upon the bottom of piece 47, Fig. 4. Having fixed upon suitable sizes for the chambers in No. 20, and of the pieces 45, we assume the aggregate amount of pressure that shall be received thereon, and then divide the maximum load to be weighed by this, and the quotient is the relative size of the chambers in the pressure-supports No. 7 to the chambers in No. 20. It often happens that this rule gives a larger chamber in No. 7 than we wish to provide. In such cases I make use of what I term a reducer—that is, I employ a pressure-support of the kind shown in Figs. 16 and 17, Sheet 3, and Figs. 22 and 23, Sheet 4, where the pressure in the chamber in pieces 26 under the diaphragm-piece 27 does not go in the pipe 30, and off to the chambers in No. 20 to be measured, but acts directly on diaphragm No. 40. These diaphragms are pressed by the liquid against flanges No. 41, which are soldered to diaphragms No. 42, which diaphragms form, with piece No. 26 and 43, respectively, in Figs. 22 and 16, chambers, in which is placed the liquid which is to act on the diaphragms in the chambers No. 20.

Diaphragms No. 40 are soldered to pieces No. 44, these being, in turn, soldered to No. 26; and diaphragms No. 42, Fig. 16, are soldered to pieces No. 43; but in Fig. 22 diaphragms No. 42 are soldered to either pieces 26 or 44, but best to 44. By making the cylindrical part of pieces 41, which rests against the diaphragm No. 40, much smaller than the cylindrical part of the other end of piece 41, which rests against diaphragm No. 42, we shall require a correspondingly small pressure of liquid acting through the diaphragm No. 42 and against one end of piece No. 41 to balance the pressure of the liquid acting through the diaphragm No. 40 against the opposite end of piece No. 41. We can thus effect any relative pressure which we desire between the liquid acting on diaphragm No. 27 and 42. We then fix the size of the chamber for the liquid in 26, which acts on diaphragm 27, to suit us, and afterward so proportion piece 41 as to give such maximum pressure of the liquid in the chambers that act upon diaphragm 42 as we desire to have act upon the diaphragms under pieces 45 and 47 in No. 20 when the maximum load to be weighed is placed on the platform A. These chambers, formed in piece 43 by the aid of diaphragms 42, Fig. 16, and in piece No. 26 by diaphragms 42, in Fig. 22, are filled by liquids through filling-screws 29, as before described, pipes 30 connecting with chambers in No. 20, Fig. 4, Sheet 1, both pipes and sealing-screws being soldered in place after the machine is adjusted. These thin diaphragms, which have the liquid acting upon them, may be made quite flat when we wish them to help keep the plungers from horizontal movement; but when there is no tendency to horizontal movement, as in the case of piece 41, or when that tendency is otherwise provided for, as in the case of piece 47, which is kept in place against such movement by pieces No. 48 and 49, Fig. 4, Sheet 1, as before described, we may then make these diaphragms of the shape shown in Fig. 24, where diaphragm 27 is shown carried out from the liquid between the plunger 28 and case 31. Figs. 24$^a$ 24$^b$ show this diaphragm better. By curving up the diaphragm, as here shown, into the annular space between pieces 28 and 31, the diaphragm will bear much greater loads than if flat, and also permit a much greater movement of the plunger resting upon it. Pieces 28 move such an extremely short distance that diaphragms 27 may well be flat, with a narrow space next thereto between 28 and 31, but diaphragms 40, 42, and 44 should be corrugated, as shown in Figs. 24, 24$^a$, 24$^b$. Having fixed the thickness and form of the diaphragms, the spaces between the plungers and their cases (i. e., the space between 28 and 31, or between 45 and 137, &c.) should be as large as possible without endangering the safety of the diaphragms, remembering that the strain on the latter is increased directly with the increase of width of this annular space.

Owing to the fact that loads to be weighed are never or seldom distributed uniformly over the platform A, and therefore give unequal pressure on the flanges 45 under 47, we have a tendency of 47 to rotate around a horizontal axis; but this tendency to rotate is guarded against by the use of the diaphragms 48 and 49, as before explained. Another way of avoiding this difficulty is to connect the pipes 30 with chamber-pieces 119, (see Figs. 25, 26, 27, and 28, where diaphragms No. 116 and plungers 117 and nuts 118 and casting 120, 121, 124 take the place of diaphragms 49, plungers 45, nuts 46, and column 47, Fig. 4, and steel piece 125, with nut 126, takes the place of 51 77, Fig. 2; and where pieces 119, 122, 123 take the places of pieces 20, 137, and 22, while pieces No. 127, 128, 129, 130, 131, 132, 133, and 135 and 134 take the places, respectively, of pieces No. 75, 80, 82, 81, 83, 85, 86, 84.) By arranging these plungers No. 117 all in one vertical line acting against the frame 120, 121, 124, there is no tendency of the frame to rotate, no matter how many of these plungers there are, or how unequal their loads may be, and we avoid the use of diaphragms No. 48 and 49, which always give some slight resistance. Pieces No. 77, Fig. 2, No. 69, Fig. 14, and No. 71, Fig. 12, are equivalent pieces, serving in each case to transmit the reduced pressure from the hydraulic-pressure supports to the weighing-beams, 80, 89, and 97. In heavy scales the pressure brought against 47 is often more than we wish transmitted to the scales or weighing-beam unless we make use of reducing-pieces, shown in Figs. 16, 17, and 22, 23, as explained; but we may avoid the use of these reducing-pieces and use the simple supports, shown in Figs. 18 or 20, in heavy scales, by making use of a reducer on the upper end of column 47, as shown in Figs. 12, 13, 14, and 15, Sheet 3. These reducers are made by placing a brass cap, 62, on the end of 47, as shown. This cap has a thin diaphragm-piece, No. 63, soldered to it, and soldered, also, to piece 58, as in Fig. 12, or to piece 68, as in Fig. 14. We also solder the diaphragm 66 to piece 68, as in Fig. 14, and 64 to the ring 73, as in Fig. 12, where 73 is also soldered to 58. Pieces 63, 68, and 66, in Fig. 14, form a sealed chamber, filled with liquid through the holes stopped by the filling-screws No. 29; and pieces 63, 58, and 64 form another similar chamber, filled with a suitable liquid in the same way. To the diaphragm 64 or 66 we solder, respectively, the columns 65 or 67, and then solder to pieces 58 and 57, respectively, thin diaphragms 72 and 73, which are fastened to pieces 65 and 67 by the pieces 71 and 69, which have screws 70, by which they are fastened. The diaphragms 64 and 72 and 66 and 73 keep pieces 65 and 67 from moving in a horizontal direction, and allow of a comparatively free movement in a vertical direction. By making the diameters of pieces 67 or 65 small in proportion to the diameter of piece 62 we may reduce the pressure on 65 and 67 to any extent we desire. Pieces 57 and 58 are secured to pieces 22 by the screws 61 and 59, and these pieces 57 and 58 receive all the upward pressure on 47, except the part transmitted to 67 and 65.

Where the machine is designed to weigh very great loads we may, if we choose, make use of the reducing-supports shown in Figs. 16 or 22 to reduce the pressure on 47, and also the reducers shown in Figs. 12 or 14 still further reduce the pressure before it acts on the scale-beam 97 or 89.

In Figs. 12 and 14 piece 93, seen in Figs. 12 and 13, and piece 93, seen in Figs. 14 and 15, are each the same, and are fastened by screws No. 100 to pieces 58 and 57. Piece 101 is a screw with lock-nut 92. Screw 101 screws in 93 and makes a seat for the knife-edges 90 and 94. These edges rest against the opposite edges 87 and 95, which set in the levers 89 and 97, which receive their loads from the columns 47 through the edges 69 and 71, or the edges 88 and 96. In the bottom of the holes made for the screw 101 is a small piece of cork, 91, which serves to keep the upper ends of 90 and 94 in their proper places. Screws 98 and 99 serve somewhat to fix the position of 87, 96, and 95, and secure them in their places.

Figs. 9, 10, and 11 show a different way of connecting the pressure-column 47 and scale-beam 102, which widens out at the end into the parts 110 110, (see Fig. 11.) Piece 111 is a piece of thin sheet metal, usually brass, copper, or steel, which is soldered to pieces No. 112 and 114, piece 114 being fastened by screws No. 115 to a lug cast on piece No. 56, and piece No. 112 is fastened to the end of the lever 110 by the screws 113. The piece No. 111 then holds down the end of the lever 110 102 at its extremity, and forms one of its fulcrums. Pieces No. 107 and 108 are fastened to a part of 47, which extends up to the top of 107 by the screws 109. Pieces 103 are lugs extending out of the sides of the lever 102. Piece 105 is a thin sheet of metal soldered to piece 104 and 108, the bar of metal 104 being fastened to the lugs of the lever 103 by the screws 106. Sheet 105 then connects the lever 102 to the pressure-column 47, and serves as a fulcrum, over which the lever acts, the load on this fulcrum being equal to the vertical pressure on 47 less the weight of 47, and as 47 rises the lever 102 rises.

In Figs. 1 and 2 the pressure-column 47 is differently connected with the scale-beam No. 80, which widens, and at the end on the upper side only, where it receives the knife-edge piece No. 75, resting on the piece No. 77. Both of these are of hardened steel. No. 77 is made perfectly plain on the top end after hardening by grinding, and No. 75 has its edge made true in the same way by grinding after it is hardened. By making the two faces which form the working-edge of 75 at right angles to each other we have no difficulty in getting this edge true and parallel to piece No. 81, which is a thin plate of steel, brass, or copper soldered to pieces 85 and 82. Piece 84 is a bar of metal, which, with 85, is fastened to piece 55 by screws 86. 82 is fastened to lever 80 by screws No. 83, and piece 81 then forms the outer fulcrum of the lever 80, connecting it with the fixed frame-piece 55, &c. The fulcrum 75 is first set, and then the side of the lugs toward No. 82 on the end of 80 is made parallel with the edge of 75, when 81 may be put in its place, and the two fulcrums always remain parallel. To the frame 22 is fixed the piece No. 152 by the screws 153, and to this is fixed the piece 149 by the screws 150. Soldered to 149 is the very thin plate No. 146, which is kept from undue expansion in its most exposed part by the thin plate 147 soldered to it. The very thin plate 146 is also soldered to piece 185, which is fastened to piece 145 by the screws 186. Pieces 145 are lugs fastened to or cast on the end of the brass lever 151, which is supported by the fulcrum or thin plate No. 146. The outer and inner faces of the lugs 145 on the end of the lever 151 are made parallel, and a thin plate of metal, 141, soldered to pieces 143 and 139, connects levers 151 and 80, pieces 143 and 139 being secured to these two levers by the screws 144 and 140. Pieces 138 are large lugs cast on or fastened to lever 80. Piece 142 is a plate soldered to 141 to prevent expansion of and stiffen the latter. Piece 161 is a thin plate soldered to pieces No. 166 and 163, and with them fastened to lugs 138 and 160 by the screws 167 and 164. The piece 161 is kept from undue expansion when under strain by being soldered to piece 162. Piece 160 is soldered to or cast on piece 165, which is a lever. The faces of the lugs 138, against which come the thin plates 161 and 141, should be quite parallel, as should also those of lugs 160, against which comes the plate 161 and 154, the latter being soldered to pieces 155 and 159, and may also be stiffened by a thin plate, 187, shown in Fig. 1, which keeps it from undue expansion under strains. Pieces No. 159 and 155 are fastened, respectively, to lugs 160 and pieces 156 152 by the screws 158 and 157.

By suspending and connecting these levers No. 151, 80, and 165 by these thin plates 146, 141, 161, and 154, we fix them against horizontal movement at this end; and by making these plates very thin and not extending the stiffening-plates Nos. 147, 142, 162, and 187 too near to the lugs on the levers, we make the levers very sensitive to pressures, causing vertical movements. The lever 151 with its movable weight 178, (which is fastened to any position by screws No. 179,) serves to balance the platform A; and to make this balancing very accurately and quickly, we have provided a small screw-weight, No. 180, which moves along on the lever as it is turned around.

Piece 181 is a little guide-piece for the right-hand end of the levers 165 and 151, and serves also to show by its pointer, which is placed upon its lower end, the relative movement of these two levers. There is a little graduated scale on the lever 165 at the end of 181 to show the exact amount of this motion. Piece 181 is secured to 151 by the nut 182. It has in it a slit, through which passes the lever 80, and thus keeps the three levers from relative lateral movement, and lever 80 is fully secured against such movement by the suspending plates at its ends. These three levers 165, 80, and 151 may be connected by ordinary rings or loops and knife-edges in the usual way; but I prefer the method here shown, although the plates No. 146 and 141 may sometimes be thus advantageously replaced on account of the great vertical motion of the levers 151 when compared with the others. The weights No. 168, 173, 175, and 179 are used, respectively, to weight the thousands, hundreds, tens, and units of pounds put upon the platform; first placing all at zero on each lever, then balancing the beams by placing their weights, respectively, in their proper positions necessary to balance the load. One of the weights 168, 173, and 175 is shown in detail at Fig. 5, Sheet 1, where 168 is the weight, 165 the lever to which it belongs, and 171 a small pin with conical point, which is pressed by the lever 169 and spring 172 into a hole made in the lever at each point of graduation, and we thus secure the weight in its exact position, which is very important. Piece 170 is the fulcrum of the lever 169. The spring 172 presses the pin 171 in its place, and the finger placed on the lever 169 over the spring raises the pin, and when we wish to move the weight.

In transporting the scale we may box up the levers after removing them, and secure a firm piece of metal over the screw 51, and then turn the screws 136 up till they press firmly against the bottom of piece 47, and they should so remain until the whole is again erected in place, when they are turned loose again so as not to touch 47.

Having thus described my invention, what I claim, and desire to secure by Letters Patent, is—

1. The combination and arrangement of the thin plates 10 10, &c., with the platform A and frame around it, as and for the purposes set forth.

2. The combination and arrangement, in weighing-machines, of two or more hydraulic-pressure supports, which support the load to be weighed, either in whole or in part, whenever the chambers containing the liquids in the different pressure-supports are not connected with those of the other supports; but each hydraulic-pressure support receives its load and transmits its pressure to the weighing-beam or beams independently of the others.

3. The combination and arrangement of the pressure-column 28, ring 36, and thin diaphragms 37 and 27, substantially as and for the purposes set forth.

4. The arrangement and combination of the cup-shaped diaphragm 38 with the case 31, as and for the purpose set forth.

5. The combination and arrangement of the two liquid-pressure chambers in piece 26, separated by diaphragm 40, pressure-column 41, and diaphragm 42, substantially as and for the purpose set forth.

6. The combination and arrangement of the sealed pressure-chambers in 26 and contained liquid, pipes 30 and contained liquid, and the sealed pressure-chambers and contained liquid in piece 20 with the thin diaphragms 44 and pressure-column 47, as and for the purposes set forth.

7. The combination and arrangement of two or more pressure-chambers and contained liquid in piece or pieces 20, acting through diaphragms 44 against a single pressure-column, 47, as and for the purposes set forth.

8. The combination and arrangement of the thin diaphragms 44, pieces 45, nuts 46, and pressure-column 47, as and for the purposes set forth.

9. The combination and arrangement of the pressure-column 47, ring or plate 62, pressure-chamber in 58, the contained liquid, and the diaphragms 63 and 64 with the pressure-column 65, as and for the purposes set forth.

10. The combination and arrangement of the guide-piece 181, levers 151, 80, and 165 with the index 190, as and for the purposes set forth.

11. The combination and arrangement, with the levers or scale-beams of weighing-machines, of thin plates to fix or connect their fulcrums, in place of the knife-edges and links or struts heretofore used, substantially as and for the purposes herein described and set forth.

ALBERT H. EMERY.

Witnesses:
 WM. H. BRERETON, Jr.,
 EDWARD H. KNIGHT.